(No Model.)
E. R. VAN BUREN.
MACHINE FOR DECORTICATING FIBROUS PLANTS.
No. 420,481. Patented Feb. 4, 1890.
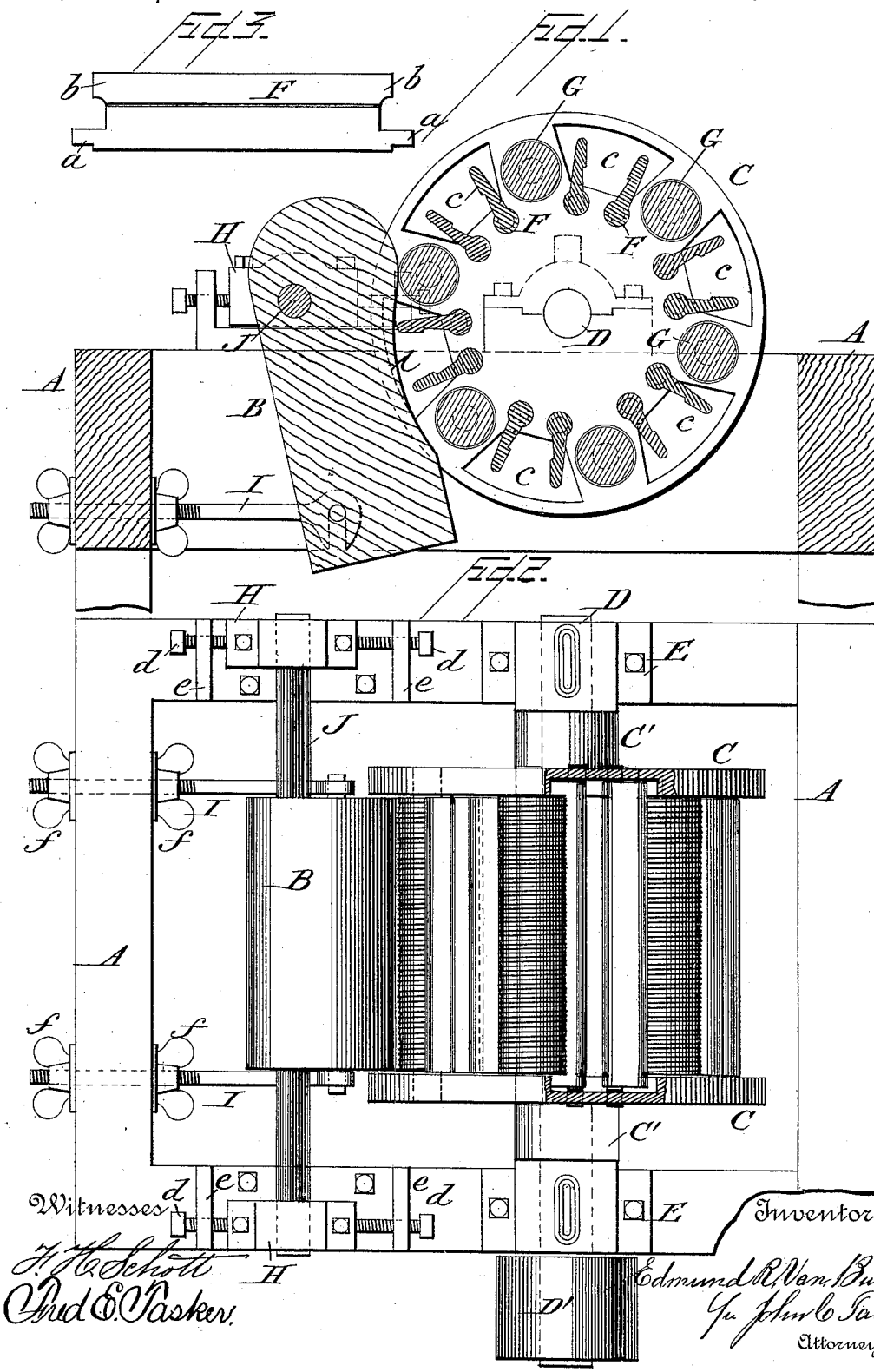
Witnesses
F. H. Schott
Fred S. Tasker
Inventor
Edmund R. Van Buren
by John C. Tasker
Attorney

UNITED STATES PATENT OFFICE.

EDMUND R. VAN BUREN, OF JACKSONVILLE, FLORIDA.

MACHINE FOR DECORTICATING FIBROUS PLANTS.

SPECIFICATION forming part of Letters Patent No. 420,481, dated February 4, 1890.

Application filed May 7, 1889. Serial No. 309,863. (No model.)

*To all whom it may concern:*

Be it known that I, EDMUND R. VAN BUREN, a citizen of the United States, residing at Jacksonville, in the county of Duval and State of Florida, have invented certain new and useful Improvements in Machines for Decorticating Fibrous Plants; and I do hereby declare the following to be a full, clear, and exact description of the invention, such as will enable others skilled in the art to which it appertains to make and use the same.

This invention relates to a machine for decorticating fibrous plants or removing therefrom the vegetable matter, so that the fiber may be prepared for use for various purposes, the invention being thus adapted for the production of many kinds of fiber, such as that obtainable from the Manila plant, sisal, maguey, palmetto, &c.; and the invention consists in the construction, arrangement, and combination of the several parts of the machine, substantially as will be hereinafter described and claimed.

In the accompanying drawings, illustrating my invention, Figure 1 is a vertical section of my improved machine for decorticating fibrous plants and preparing fiber. Fig. 2 is a top plan view of the machine in partial section. Fig. 3 is a detail view of one of the beaters or strikers.

Like letters of reference designate corresponding parts in the several figures.

A denotes the main frame of the machine, having any desirable and convenient structure wherein the several mechanical parts of the invention may be conveniently arranged for successful operation. I am limited to no precise form for the shape of the main frame A, as it may vary in size and in the arrangement of its parts.

Journaled in the upper portion of the main frame A, in boxes E E, secured to the top of said frame, is a horizontal shaft D, carrying at one end a driving-pulley D', to which the power which actuates the machine is applied. Firmly secured upon this shaft are two vertical circular disks C C, having horizontal sleeves C' C' cast integral therewith and inclosing the portions of the shaft between the disks and the journal-boxes, so that the disks may be attached rigidly to the shaft. The diameter of these disks and their thickness and distance apart may vary in different machines. The inner opposing faces of the disks C C are provided each with a series of oppositely-located recesses *c c*, disposed in a circular line near the periphery of each disk, said recesses being separated from each other by a convenient interval and penetrating into the substance of the disks a short distance—say half-way or thereabout—as indicated in the sectional portion of the plan view of Fig. 2.

A series of horizontal rollers G G is arranged between the two disks C C, said rollers being journaled in the disks at points in the spaces between the recesses *c c*. Of these rollers there may be any desirable and convenient number. They are so journaled as to be capable of rotation.

F F denote the beaters or strikers. They are likewise arranged horizontally between the disks and are journaled therein. A detail view of one of these strikers is shown in Fig. 3. Two of them are journaled below each recess *c*. The lower edge of these strikers is provided with end journals *a a*, that loosely enter the disks in such a manner that the strikers may be easily movable upon these journals. The upper edge of the strikers has end projections *b b*, adapted to enter the recesses *c*. It will be observed that these strikers have a general flat shape; that they occupy positions approximately on radial lines of the disk; that their opposite faces are indented, as shown, in order to make them more serviceable, and that they are capable of an oscillation in their bearings, said oscillations being limited by means of the projections *b b* within the recesses *c*, so that the strikers cannot be thrown into contact with the rollers G. The position of the strikers when the machine is in operation, and the disks in consequence are rapidly revolving, is shown in Fig. 1. When the machine is at rest, obviously these strikers will collapse from the position shown in Fig. 1, some of them dropping so as to rest upon each other.

B indicates a bed or block upon which the rollers and strikers operate during the revolution of the disks which carry them. This block B is of wood or other suitable hard material. It is adjustably arranged within the frame with relation to the strikers and rollers. In that example of the block B employed for illustration in the present description it is shown as having a vertically-elongated form. Through the block near the upper end passes a horizontal rod J, the extremities of which enter the sliding boxes H H, located upon the top of the main frame A, said boxes being movable forward and backward by means of adjusting-screws $d\ d$, that pass through vertical projections $e\ e$ on the main frame and bear against the boxes. Thus it will be seen that when the adjusting-screws $d\ d$ are regulated the upper end of the bed or block B will be moved toward or away from the rollers and strikers. The lower portion of the block B is adjusted by means of horizontal rods I I, having hooked ends that engage pins projecting from the block, said rods I I passing through the main frame, and being screw-threaded and provided with nuts $f\ f$ movable thereon and pressing on opposite sides of the main frame. By turning these nuts the rods can be adjusted endwise and the lower part of the block B moved toward or away from the strikers and rollers. I preferably concave that face of the block B which is nearest to the strikers and rollers, as shown at $l$ in Fig. 1, so that during the revolution of the disks the strikers and rollers may move around through this slight concavity, and thus be better brought into juxtaposition to the block.

Having thus described the construction of the several mechanical parts of my improved decorticator, I will proceed now to describe the manner of the operation thereof and the way in which it is to be used for accomplishing its purpose.

The operator will stand in the rear of the bed-block B, and from this position will feed the fibrous material into the machine over the top of the said bed-block, and, still grasping the material firmly in his hands, will allow it to be drawn between the said block and the rapidly-rotating rollers and strikers. Manifestly, when the shaft D under the actuation of the motive power is rapidly rotated, the disks and the strikers and rollers carried thereby will be revolved at more or less speed. It may here be remarked that the rollers G are preferably provided with spiral or other grooves, as shown in Fig. 2. As the material is beaten between the strikers and rollers and the bed-block the pulp or other vegetable matter on said material will by this operation be thoroughly loosened from the fiber. The operator, after holding the material thus subjected to the operation of the striking devices for a sufficient length of time to effect this loosening of the vegetable matter from the fiber, will draw said material back toward him and out of the machine, and by so doing the loosened vegetable substances will be stripped clean off the fiber, leaving said fiber decorticated and properly prepared for use.

If the material which is fed to the machine be too long to be thoroughly cleaned by going through one operation of being beaten, the operator can reverse the material, and after one end thereof has been cleaned can lay hold of it and put the other end through the same operation.

My machine will prepare fiber as fast as it can be fed thereto, and after the clean fiber perfectly free of vegetable matter is removed from the machine it needs only to be dried in order to be in complete marketable condition.

Having thus described my invention, what I claim as new, and desire to secure by Letters Patent, is—

1. In a machine for producing fiber from fibrous plants, the combination of the main frame, the adjustable bed-block carried thereby, the rod J, passed through its upper portion, the boxes H H, in which said rod is carried, said boxes being adjusted by means of set-screws $d$, carried in projections $e$ on the frame, the two disks secured on a shaft journaled in the said frame, and the horizontal rollers and strikers journaled in said disks, substantially as described.

2. In a machine for preparing fiber, the two disks secured on a rotating shaft, the inner opposing faces of said disks being provided each with a series of opposite recesses, a series of rollers journaled in the disks between said recesses, and a series of flat strikers journaled in the disks in pairs below said recesses and having projections that enter them, substantially as described.

3. The combination, with the bed-block and the main supporting-frame, of the shaft journaled in said frame and having a drive-pulley, two disks secured on said shaft whose inner opposing faces are recessed, a series of grooved rollers journaled in the disks between said recesses, and a series of flat strikers journaled at their lower ends in the disks in pairs below the recesses and having projections that enter the recesses, all substantially as described.

4. The combination, with the striking mechanism, of the bed-block B, the shaft J, passing through the upper end thereof, the boxes H H on the main frame, in which the shaft is carried, and the adjustable rods I I, having adjusting-nuts $f\ f$ and hooked at their ends to engage pins on the bed-block, substantially as described.

5. In combination with a suitable bed-block, the two disks C C, secured on the shaft journaled in the main frame, the inner opposing faces of said disks having recesses $c\ c$, the rollers G, journaled in the disks between said recesses, and the strikers F, journaled in pairs in the disks below said recesses and having projections *b b*, that enter the recesses, substantially as and for the purpose described.

6. The combination of the adjustable bed-block B, having rod J passed through its upper portion and carried in boxes H H, adjusted by means of set-screws *d*, carried in projections *e* on the frame, the horizontal rods I I, carrying adjusting-nuts *f f* and hooked at the ends to engage the pins on the lower portion of the block, and the striking mechanism, substantially as described.

In testimony whereof I affix my signature in presence of two witnesses.

EDMUND R. VAN BUREN.

Witnesses:
W. B. OWEN,
E. W. VAIL.